US006785950B1

(12) United States Patent
Scirbona et al.

(10) Patent No.: US 6,785,950 B1
(45) Date of Patent: Sep. 7, 2004

(54) BATTERY-POWERED WIRE INSERTION IMPACT TOOL

(75) Inventors: Edward Scirbona, Danbury, CT (US); Edward Bazayev, Kew Gardens, NY (US)

(73) Assignee: Jonard Industries Corp., Tuckahoe, NY (US)

( * ) Notice: Subject to any disclaimer, the term of this patent is extended or adjusted under 35 U.S.C. 154(b) by 298 days.

(21) Appl. No.: 09/943,274

(22) Filed: Aug. 31, 2001

(51) Int. Cl.[7] .................................................. B23P 23/00
(52) U.S. Cl. ......................... 29/566.4; 29/750; 173/203
(58) Field of Search ............................... 29/566.4, 750, 29/758, 566.3, 751, 702; 173/203, 205, 133, 68, 117, 104, 129, 123; 227/132

(56) References Cited

U.S. PATENT DOCUMENTS 5,794,325 A * 8/1998 Fallandy .................... 29/566.4
6,076,330 A * 6/2000 Thomas et al. ................ 53/75

* cited by examiner

*Primary Examiner*—Richard Chang

(57) ABSTRACT

A battery-powered impact wire insertion tool that employs an electric motor to implement the impacting function. The electric motor is provided with suitable gearing that reduces its speed but increases its torque. An activator mechanism is employed to convert multiple revolutions of the motor shaft into a stored compressive force that after a predetermined number of shaft revolutions is triggered to release the compressive force to drive a hammer against an insertion blade mounted in the tool. The activator mechanism comprises axially-aligned cylindrical end cams with generally complementary surfaces that upon rotation of a driven cam axially extends a follower cam compressing a power compression spring, and upon encountering a cam lobe the driven and follower cams abruptly come together releasing the spring delivering the desired impact to the blade.

9 Claims, 3 Drawing Sheets

BATTERY-POWERED WIRE INSERTION IMPACT TOOL

This invention relates to a power wire insertion impact tool, and in particular to a battery-powered tool adapted for insertion of conductor wire in connector blocks and the like.

BACKGROUND OF THE INVENTION

Wire insertion manual impact tools are well known in the art and are commonly used nowadays for the making of connections to terminals on connector blocks in the electronic and telecommunication fields. See, for example, U.S. Pat. No. 4,241,496, whose contents are herein incorporated by reference, as an example of such tools.

Such tools often use an operating mechanism in which a hammer is biased by a compression coil spring to tilt the hammer or another element with respect to the longitudinal axis of the tool. When the hammer or other element is aligned with the axis, the coil spring is released producing the desired impact. Other tools have used a detent mechanism maintaining a spring-biased hammer until the detent is triggered and the kinetic energy of the hammer is transmitted to a blade and in turn to the wire.

Power wire insertion tools are also known. Typically, they are powered by electrical power from a room outlet and employ an electrical solenoid which is operated to provide the desired impact when a trigger is activated. These power tools demand less effort from the user and are often preferred especially when numerous wires have to be inserted.

A problem is that such power tools are less likely to be used in the field where no local power source is readily available. Moreover, such solenoid-operated insertion tools are not easily operated by a battery because the solenoid consumes too much electrical power and thus the battery is quickly exhausted.

BRIEF SUMMARY OF THE INVENTION

An object of the present invention is an improved impact insertion tool.

A further object of the invention is a battery-powered impact insertion tool that consumes less electrical power than the known tools of the solenoid type operated off the common household voltage.

Another object of the invention is a battery-powered insertion tool exhibiting a reasonable lifetime before requiring battery recharging.

Still another object of the invention is a battery-operated insertion tool that is inexpensive to manufacture.

These objects are achieved in accordance with a feature of the present invention by a battery-powered insertion tool that employs an electric motor to implement the impacting function. The electric motor is provided with suitable gearing that reduces its speed but increases its torque. An activator mechanism is employed to convert multiple revolutions of the motor shaft into a stored compressive force that after a predetermined number of shaft revolutions is triggered to release the compressive force to drive a hammer against an insertion blade mounted in the tool.

In accordance with a preferred embodiment of the invention, the activator mechanism comprises axially-aligned cylindrical end cams with generally complementary surfaces that upon rotation of one of the cams axially extends the other cam compressing a power compression spring, and upon encountering a cam lobe the cams abruptly come together releasing the spring delivering the desired impact to the blade.

Another feature is the addition of an impact-force changing feature in the tool that allows a user to change the impact force between a high and a low value.

A further feature is the addition to the tool of means for changing the orientation of the blade during use.

BRIEF DESCRIPTION OF THE DRAWINGS

These and other objects, features and advantages of the present invention will become more readily apparent from the following detailed description of a presently preferred embodiment when taken in conjunction with the accompanying drawings wherein.

In the drawings.

DETAILED DESCRIPTION OF THE PREFERRED EMBODIMENTS

Figure 2:
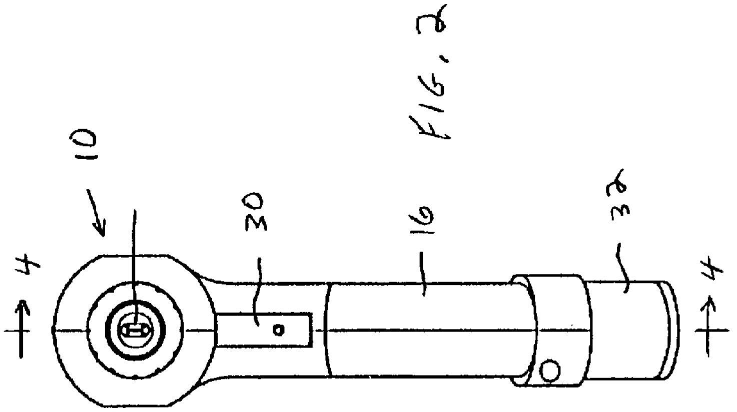
FIG. 2 is a front view of the tool of FIG. 1.
Figure 1:
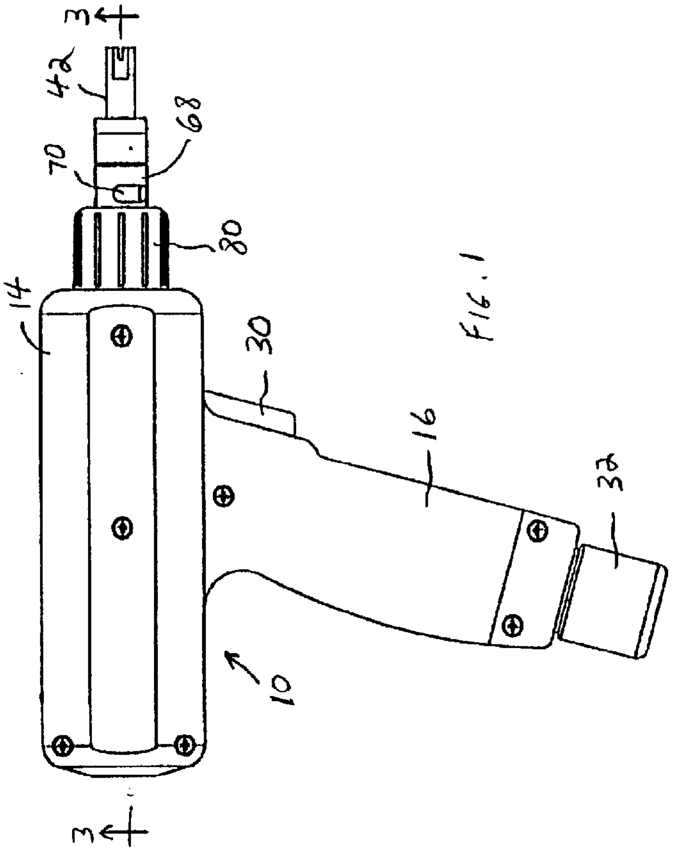
FIG. 1 is a side view of one form of wire impact insertion tool according to the invention.

An impact insertion tool 10 according to one form of the invention is shown in FIGS. 1–4. It includes a gun-type housing comprising a main body 14 supported on a handle 16. An electric motor 18 drives a shaft 20 which operates a well known 2-stage, planetary gear system 22 which gears down the motor shaft by a factor of about 40–60:1. The planetary gear system 22 rotates about a longitudinal axis 24. Its details are conventional and not part of the present invention. The motor 18 is activated by a trigger 30 which when pulled closes a circuit which includes a battery power source 32 at the rear of the handle 16. The mechanical parts of the switch circuit are shown schematically in FIG. 4 at 34 and are conventional. The electrical schematic will be discussed below.

It will be observed that the gun-type tool is similar to the power wire-wrapping tool described in U.S. Pat. No. 6,269,845, whose contents are herein incorporated by reference. The preferred embodiment of the present invention uses a housing, battery compartment, and a motor somewhat similar to that used in the power wrapping tool described in the referenced patent. Since the latter is in mass production, this contributes to the low fabrication costs of the tool of the present invention.

Figure 3:
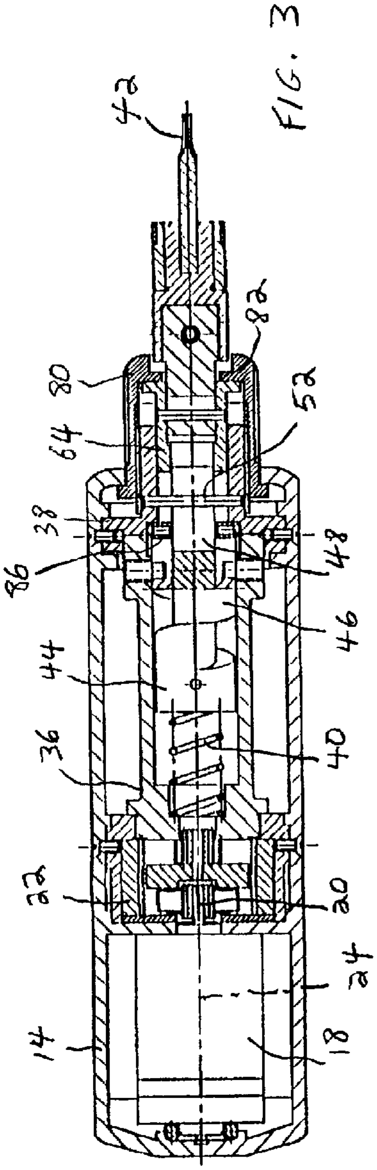
FIG. 3 is a partial horizontal cross-sectional view of the tool of FIG. 1 along the line 3—3.
Figures 4, 5, 6:
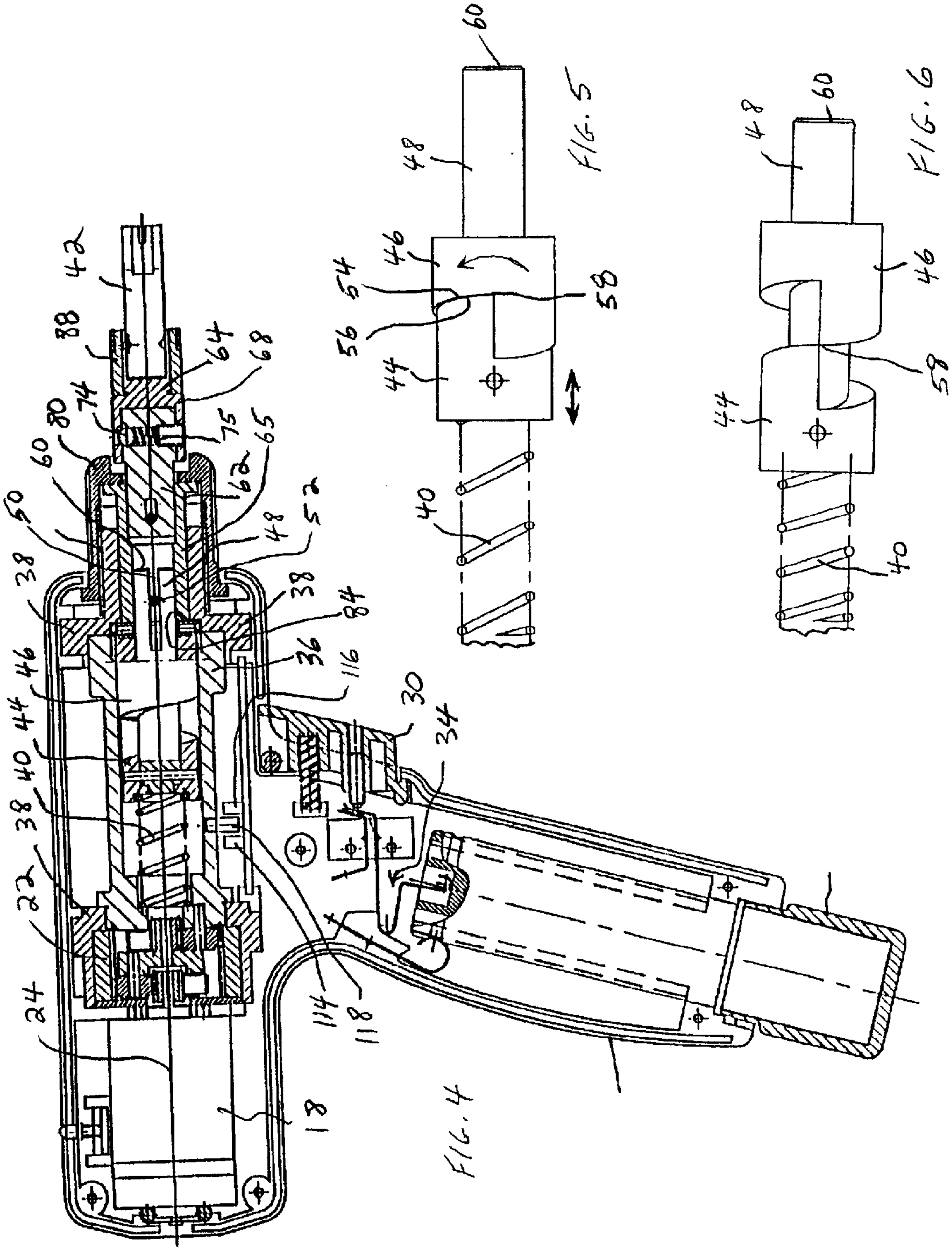
FIG. 4 is a partial vertical cross-sectional view of the tool of FIG. 1 along the line 4—4.
FIG. 5 is a partial schematic view of the activating cam mechanism of the tool of FIG. 1 shown in the position before the tool is operated.
FIG. 6 is a view similar to that of FIG. 5 with the cam mechanism shown in the position after the tool is operated but just before the compressed spring is released.

Attached to the rotating gear system 22 is an axially-aligned elongated cylindrical element 36 that rotates with the gear system 22 and is journaled between two bushings 38 secured to the housing 14. A power compression spring 40 of the type usually found in manual impact tools is mounted to the inside of the elongated element 36, and between it and the standard insertion blade 42 at the gun front is a mechanism that converts the motor shaft rotations into an axial force that compresses the spring 40 from its initial state and then abruptly releases the spring 40 to apply the desired impact force to the blade 42. This is achieved by two axially-aligned cylindrical cams 44, 46 whose facing end surfaces engage and are approximately complementary to one another. The cam 44 nearest the motor and adjacent and engaging the power spring 40 is the follower cam and it is axially-slidable but not rotatable within the elongated cylinder 36. The follower cam 44 also comprises a shaft 48 that extends forwardly and terminates in an axially-extending slot 50 that is pinned 52 to the front bushing 38 and thus rotatably-fixed to the housing. The slot 50 allows the shaft 48 to move axially but prevents its rotation. The cam 46 furthest from the motor 18 is the driven cam and rotates with the elongated cylinder 36. As illustrated in FIGS. 5 and 6, the camming surfaces 54, 56 are configured so that in the cams rest position (FIG. 5), the overall axial length of the two cams is a first minimum value, but when the cams have rotated while engaged nearly one complete revolution, just before reaching a cam lobe 58 (shown in FIG. 6), the overall axial length of the two cams is a second maximum value, during which the axially-displaced follower 44 compresses the power spring 40 by an amount substantially equal to the difference in their axial lengths, i.e., the difference between the first and second values. Upon encountering the cam lobe 58, there is an abrupt reduction in the overall axial cam lengths causing the expanding power spring 40 to drive the follower cam forward and the front surface 60 of the cam shaft 48 acting as a hammer 62 impacts a blade-support mount 62 and the latter in turn transfer its kinetic energy via a punch holder 64 to the blade 42 producing the desired impact. It will be appreciated that in the normal operation, the user presses down on the wire and connector with the blade 42, the result of which is to push the blade-support mount 62 rearwards a short distance until it engages a shoulder on an inner bushing 64 leaving a small space between the facing surfaces of the blade-support mount 62 and cam shaft 48. Following the impact, the rest position illustrated in FIGS. 3 and 4 is restored.

The configuration of the complementary camming surfaces 54, 56 may be described, generally, as a helical surface that expands axially, and the rotation of the driven cam 46 pushes the follower cam 44 to the left in FIG. 5. When the complementary cam lobes 58 meet, the follower 44 has reached the furthest point of its movement and the spring 40 its maximum compression. The right angle orientation of the camming surfaces (compared to the surface shape just prior to the lobe), means that as soon as the lobes pass one another, the cam 44 is driven forward (to the right) by the spring toward its rest position (FIG. 5). Before the cam surfaces can reengage, the shaft end surface 60 impacts the facing blade-support mount 62 surface which drives the punch holder 64 forward finally allowing the camming surfaces to reengage in their rest position. Thus, the impact force is not delivered to the blade via the camming surfaces directly thus minimizing cam wear.

Assuming an electric motor with a shaft rotation of 10,600 rpm, at a reducing gear ratio of 50:1, it would require approximately 20 motor shaft rotations to produce one complete revolution of the cams and thus one impact. For a typical 3.6 Volt portable battery of the type conventionally used in power tools, the typical battery should be capable of well over 1500 impacts or wire insertions before requiring recharging. This is satisfactory for field use of such a tool. The time required for the motor to provide the required number of shaft rotations per impact is under 0.25 sec. or less, hardly noticeable to the typical user.

Figure 7:
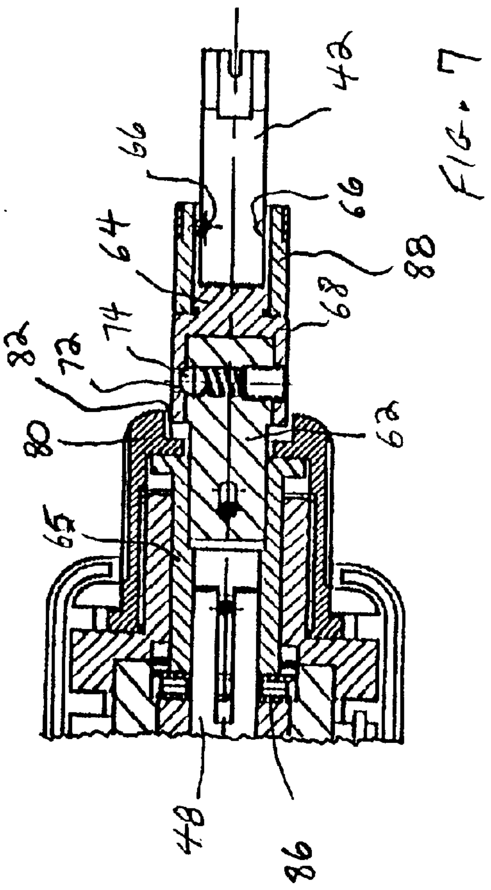
FIG. 7 is a partial cross-sectional view showing the force changing mechanism of the tool illustrated in FIG. 1 in its high impact position.

A feature of the invention is to provide the user with controllable impact force capability. Just behind the front end of the tool is a rotatable collet 80 with internal screw threads that threadingly engages the fixed front bushing 38 and functions to change the blade impact pressure. It preferably accomplishes this by means of an inwardly extending shoulder 82 that engages an outward extension of the internal bushing 65 which is slidingly mounted on the cam shaft 48 and blade-support mount 62. The bushing rear 84 engages a needle bearing set 86 (FIG. 4) and is thus coupled to the front cam 46. When the collet 80 is rotated, its axial position changes and via its coupling to the front cam 46 changes the axial position of the latter. This is illustrated in FIGS. 4 and 7. FIG. 4 shows the position of the collet 80, the bushing 84 and cams when the collet 80 has been rotated to its low impact force position; FIG. 7 shows the position of the collet 80, the bushing 65 and cams when the collet has been rotated to its high impact force position. These positions may be marked on the outside of the collet as MIN and MAX. Intermediate positions of the collet 80 will provide impact forces varying continuously between the MIN and MAX values. In the low-impact-force position, the collet 80 and bushing 65 are positioned furthest from the motor, and in its high-impact-force position they are positioned nearest to the motor. Its positioning by the user to MIN position is by rotating the collet CCW (viewed from the front), which moves the cylindrical cams away from the power spring; its repositioning by the user to its MAX position is by rotating the collet CW which moves the cylindrical cams toward the power spring. The first action lengthens the rest position of the power spring and the second action shortens the rest position of the power spring. Since the axial lengthening of the dual cams 44, 46 during operation remains the same, the shorter power spring when compressed produces a larger impact force; the longer power spring when compressed produces a smaller impact force.

Figure 8:
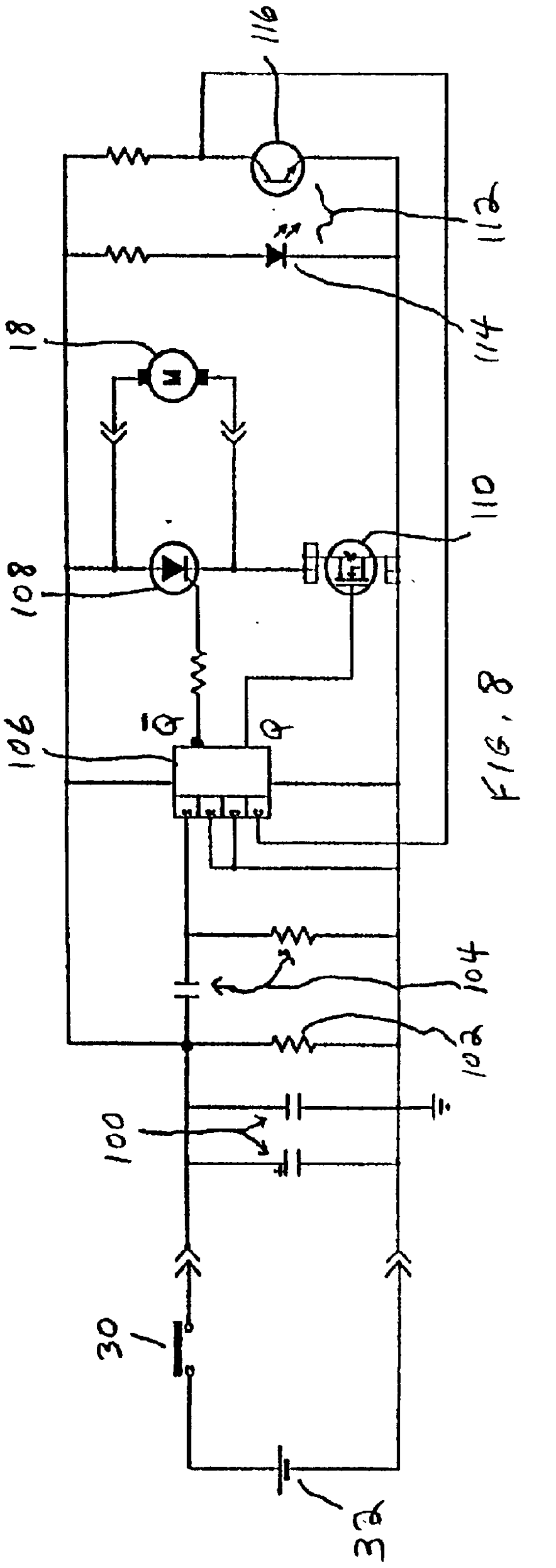
FIG. 8 is a partial circuit schematic showing how the motor operates and the blade position is controlled.

A further feature is to force the blade 42 into its normal rest orientation, either horizontally, or vertically as illustrated in FIG. 3, when the tool completes its insertion operation. This is preferably achieved by automatically stopping the motor 18 when the dual cams have completed one full revolution and the power spring has been released. This is accomplished in a preferred embodiment by means of electronic circuitry and an opto-electronic coupler which senses when the cams have completed one full revolution and opens the circuit and short-circuits the motor windings to immediately stop the motor. A preferred form of the circuit is shown in FIG. 8. The battery 32 and gun switch 30 are shown at the left. These are connected to a low/high frequency filter 100, to a discharge resistor 102, and to an RC circuit 104 whose junction is connected to the S or set terminal of a conventional flip/flop 106 which is powered via its vertical connections to the battery and ground. The R or reset and D or data terminals are connected together to ground. The upper Q-bar (NOT-Q) output is connected to the gate of an SCR 108 via a resistor. The anode and cathode of the SCR are connected across the motor 18 windings. The SCR cathode is also connected in series with a HEXFET switch 110 whose gate is connected to the lower Q output of the flip/flop 106. An opto-electronic sensor 112 comprises an LED 114 optically coupled to a photo-transistor 116 whose collector is connected via a pull-up resistor to the positive side of the battery. The emitter is grounded. An output signal is taken from the collector and is coupled back to the C or clock input of the flip/flop 106. The LED and photo-transistor are physically positioned in spaced relation on the housing as shown in FIG. 4. A screw 118 serving as an opaque barrier is mounted on the elongated cylinder 36 and rotates with it. In the rest position of the tool, the optical barrier 118 is positioned just past its blocking position between the LED and photo-transistor; typically, say, 10–40° past the blocking position.

Operation is as follows. With the gun switch 30 OPEN, the S input is LOW and Q is also LOW. HEXFET switch 110 is also OFF. The motor has no power. The LED 114 is OFF until the switch 30 is activated. Once the operator activates the switch 30 ON, the LED 114 goes ON. With no barrier 118 present, the photo-transistor 116 is also ON, and its collector is LOW and thus the C input is also LOW. Though Q-bar becomes high, the SCR 108 is also OFF since the HEXFET switch 110 is also OFF. However, when the gun switch 30 closed, a single positive HIGH pulse was transmitted to the S input which flipped the state of the flip/flop 106, making Q-bar LOW and Q HIGH. This turned ON the HEXFET switch 110 providing motor power which then rotated its shaft. The operator keeps the switch 30 closed until the impact takes place maintaining motor power. After one full rotation of the rotating subassembly 36, the high-low cam lobes meet and pass, the compressed spring releases producing the desired impact and the optical barrier 118 is interposed between the LED and photo-transistor. The photo-transistor goes OFF, its collector goes HIGH and so does the C input. The flip/flop 106 changes state on the rising C input, its Q output goes LOW turning off the HEXFET switch 110 and the power to the motor, and Q-bar goes HIGH. This turns ON the SCR 108 and the stored energy in the motor's inductive field is shorted through the ON SCR 108 which acts to electrodynamically brake the motor which brings it to a quick stop, though the optical barrier 118 would have by now coasted past its blocking position and the original conditions are restored including restoring of the flip/flop 106 to its original state. The electrodynamic braking and quick stopping of the motor ensures that the original orientation of the blade is restored. The position of the optical barrier 118 can be adjusted at the factory to ensure that the ending blade orientation is that desired. While the above circuit is preferred and is inexpensively implemented on a small circuit board positioned within the housing 14, those skilled in the art will recognize that other ways can be used to achieve the stopping of the motor following the impact with the blade oriented at a consistent position relative to the gun housing.

This tool has the same adjustable blade orientation feature described in a copending patent application, Ser. No. 09/922,256, filed Aug. 6, 2001, whose contents are herein incorporated by reference, in which the blade 42 has notches 66 on opposite edges allowing the blade to be rotated 180° and seated in either position via the front collet 88, and in addition a blade-orientation collet 68 with a circumferential slot 70 having detent recesses 72 at opposite slot ends engageable by a spring-loaded ball 74. The spring is shown at 75. The collet 68 is rotatably mounted on the punch holder 64 so that it has two stable circumferential positions 90° apart. As a result, the blade can be oriented by the user while mounted during use in one of the two 90° positions, and can also be removed from the punch holder 64, rotated 180° and remounted, providing versatile use by the user when inserting wires into horizontally or vertically oriented connectors and with the blade positioned to cut off the left or right side of the wire as desired.

Among the advantages of the power tool of the invention as described herein are: low battery power consumption extending battery life, ease of operation with minimum user stress, low-cost manufacture, user-adjustable impact force between maximum and minimum values and also continuously adjustable between those maximum and minimum values, no excessive wear of the camming surfaces as they are not in the impact path between the power spring and the hammer, and blade orientation in one of four possible circumferential positions.

While the invention has been described in connection with preferred embodiments, it will be understood that modifications thereof within the principles outlined above will be evident to those skilled in the art and thus the invention is not limited to the preferred embodiments but is intended to encompass such modifications. For example only, the continuously adjustable force-controlling collet 80 can be replaced by a bayonet-type mounting which however will typically allow only two impact force positions. As another example, the planetary gear-reduction system could be replaced by a worm gear system to obtain a similar speed reduction; however, this might result in the need for a larger housing which is undesirable.

What is claimed is:

1. A tool for impact insertion of a wire into a terminal, wherein the tool comprises:

a) a gun-shaped housing with a front and a rear and a handle with a trigger mechanism, b) electric motor drive means within the housing and having a shaft and with the drive means operatively connected to the trigger mechanism and including a planetary gear-down mechanism having an output for reducing the motor shaft speed while increasing its torque, said motor means and rear-down mechanism having a common axis, c) a battery mounted in the housing and electrically connected to drive the motor, d) an axially-arranged power compression spring having a rest position and a compressed position, e) first means at the front of the housing for supporting a blade for inserting a wire into the terminal when impacted, f) second means coupled between the power compression spring and the first means in response to multiple revolutions of the motor shaft for axially compressing the spring from its rest position into its compressed position and operative to suddenly release the compressed spring to impact the first means and in turn the blade, g) said second means for axially compressing the spring comprising a driven cam rotatable with the gear-down mechanism and a follower cam mounted for axial movement and connected to the compression spring, said cams being configured such that a predetermined rotation of the driven cam axially moves the follower cam so as to move the compression spring from its rest to its compressed position, h) third means for adjusting the impact force, said third means for adjusting the impact force comprising fourth means for axially adjusting the length of the compressed spring while in its released position.

2. A tool as claimed in claim 1, wherein the second means for compressing the spring comprises cylindrical cams with complementary cam surfaces and sharp cam lobes configured so as to cause the cam length to increase when rotated until the cam lobe is encountered.

3. A tool as claimed in claim 1, wherein the fourth means is located at the front of the gun.

4. A tool for impact insertion of a wire into a terminal, wherein the tool comprises:

a) a gun-shaped housing with a front and a rear and a handle with a trigger mechanism, b) electric motor drive means within the housing and having a shaft and with the drive means operatively connected to the trigger mechanism and including a planetary gear-down mechanism having an output with reduced speed but with increased torque, said motor means and gear-down mechanism having a common axis, c) a battery mounted in the housing and electrically connected to drive the motor, d) an axially-arranged power compression spring having a rest position and a compressed position, e) first means at the front of the housing for supporting a blade for inserting a wire into the terminal when impacted, f) second means coupled between the power compression spring and the first means in response to multiple revolutions of the motor shaft for axially compressing the spring into its compressed position and operative to suddenly release the compressed spring to impact the first means and in turn the blade, g) said second means for axially compressing the spring comprising a driven cam rotatable with the gear-down mechanism and a follower cam mounted for axial movement and connected to the compression spring, said cams being configured such that a predetermined rotation of the driven cam axially moves the follower cam so as to move the compression spring from its rest to its compressed position, h) third means for adjusting the impact force, said third means for adjusting the impact force comprising fourth means for axially adjusting the length of the compressed spring while in its released position, wherein the fourth means for axially adjusting the length of the compressed spring comprises a bushing connected to the spring and a rotatable collet mounted at the front of the tool for axially moving the bushing.

5. A tool as claimed in claim 4, wherein the bushing is connected to the driven cam for pushing the latter and the adjacent follower cam toward the spring to pre-compress it to increase the impact force.

6. A tool for impact insertion of a wire into a terminal, wherein the tool comprises:

a) a gun-shaped housing with a front and a rear and a handle with a trigger mechanism, b) electric motor drive means within the housing and having a shaft and with the drive means operatively connected to the trigger mechanism and including a planetary gear-down mechanism having an output with reduced speed but with increased torque, said motor means and gear-down mechanism having a common axis, c) a battery mounted in the housing and electrically connected to drive the motor, d) an axially-arranged power compression spring having a rest position and a compressed position, e) first means at the front of the housing for supporting a blade for inserting a wire into the terminal when impacted, f) second means coupled between the power compression spring and the first means in response to multiple revolutions of the motor shaft for axially compressing the spring into its compressed position and operative to suddenly release the compressed spring to impact the first means and in turn the blade, g) said second means for axially compressing the spring comprising a driven cam rotatable with the gear-down mechanism and a follower cam mounted for axial movement and connected to the compression spring, said cams being configured such that a predetermined rotation of the driven cam axially moves the follower cam so as to move the compression spring from its rest to its compressed position, h) third means mounted at the tool front for adjusting the circumferential orientation of the blade.

7. A tool for impact insertion of a wire into a terminal, wherein the tool comprises:

a) a gun-shaped housing with a front and a rear and a handle with a trigger mechanism, b) electric motor drive means within the housing and having a shaft and with the drive means operatively connected to the trigger mechanism and including a planetary gear-down mechanism having an output with reduced speed but with increased torque, said motor means and gear-down mechanism having a common axis, c) a battery mounted in the housing and electrically connected to drive the motor, d) an axially-arranged power compression spring having a rest position and a compressed position, e) first means at the front of the housing for supporting a blade for inserting a wire into the terminal when impacted, f) second means coupled between the power compression spring and the first means in response to multiple revolutions of the motor shaft for axially compressing the spring into its compressed position and operative to suddenly release the compressed spring to impact the first means and in turn the blade, g) said second means for axially compressing the spring comprising a driven cam rotatable with the gear-down mechanism and a follower cam mounted for axial movement and connected to the compression spring, said cams being configured such that a predetermined rotation of the driven cam axially moves the follower cam so as to move the compression spring from its rest to its compressed position, h) third means for controllably stopping the motor at a desired circumferential orientation of the blade.

8. A tool as claimed in claim 7, wherein the third means for controllably stopping the motor comprises opto-electronic means coupled to sense a predetermined amount of rotation of the gear mechanism and circuit means for dynamically braking the motor in response to a signal from the opto-electronic means.

9. A tool as claimed in claim 7, wherein the cams are configured to rotate one revolution to move the spring from its rest position to its compressed position and then to release it to restore its rest position.

* * * * *